United States Patent [19]

Olson

[11] Patent Number: 4,540,561

[45] Date of Patent: Sep. 10, 1985

[54] REMOVAL OF H₂S FROM GASEOUS STREAMS

[75] Inventor: Donald C. Olson, Houston, Tex.

[73] Assignee: Shell Oil Company, Houston, Tex.

[21] Appl. No.: 685,707

[22] Filed: Dec. 24, 1984

[51] Int. Cl.³ .................... B01D 53/34; C01B 17/05
[52] U.S. Cl. ................... 423/573 R; 423/226
[58] Field of Search .............. 423/224, 226, 573 G, 423/573 R

[56] References Cited

U.S. PATENT DOCUMENTS 3,068,065  12/1962  Hartley et al. ................... 423/228
4,009,251  2/1977   Meuly ............................. 423/573 G

FOREIGN PATENT DOCUMENTS 45-14884  5/1970  Japan ........................ 423/573 R
45-14885  5/1970  Japan ........................ 423/573 R

*Primary Examiner*—Earl C. Thomas
*Attorney, Agent, or Firm*—Albert J. Adamcik

[57] ABSTRACT

A process for the removal of hydrogen sulfide from a variety of gas streams is disclosed. The gas stream containing the sour gases is contacted with a reactant solution comprising iron (Fe III) lignosulfonate. The hydrogen sulfide is converted to sulfur, and the reactant is reduced. The process may be cyclic, and may include sulfur removal and regeneration of the reactant.

11 Claims, No Drawings

REMOVAL OF H₂S FROM GASEOUS STREAMS

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted with an aqueous solvent-reactant system, which comprises a regenerable reactant, to produce solid free sulfur which is recovered either prior to or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

A problem associated with such processes is that the chelates decompose or degrade significantly over time, requiring replacement thereof and removal of the degradation products. Since the chelates are costly materials, the economics of such processes are directly affected by the extent of decomposition of these materials. A process which either prevented such degradation or provided an alternative inexpensive reactant composition might have great utility.

SUMMARY OF THE INVENTION

Accordingly, the invention, in one embodiment, relates to a process for the removal of $H_2S$ from a sour gaseous stream comprising contacting the sour gaseous stream under reaction conditions, i.e., under conditions to convert $H_2S$, in a contacting zone with an aqueous reaction solution comprising an effective amount of iron(III) lignosulfonate. The iron(III) of the composition reacts with the $H_2S$ according to the following reaction:

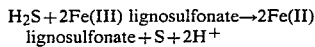

$$H_2S + 2Fe(III)\ lignosulfonate \rightarrow 2Fe(II)\ lignosulfonate + S + 2H^+$$

A sweet gas stream is produced, and an aqueous admixture containing sulfur and a reduced reactant is removed from the contact zone. In the circumstance where the concentration of $H_2S$ in the gaseous stream is relatively low, the low cost of the iron(III) lignosulfonate, coupled with its relatively high solubility, may make it possible to remove $H_2S$ effectively, and, after the substantially exhausting the iron(III) of the composition, simply to dispose of the spent solution and sulfur. In most circumstances, however, the process will be operated as a cyclic process in which the iron(II) lignosulfonate is regenerated, the solution then being returned for re-use. Because of the low cost of the reactant and the robustness of the lignosulfonate, degradation is not of great concern.

Accordingly, the invention also relates to a process for the removal of $H_2S$ from a sour gaseous stream in which the sour gaseous stream is contacted under reaction conditions with an aqueous reaction solution containing an effective amount of iron(III) lignosulfonate in a contact zone, producing a sweet gas stream and an aqueous admixture comprising sulfur and reduced, i.e., Fe(II), lignosulfonate, and a portion of the admixture is removed from the contact zone. If the reaction or contacting is carried out below the melting point of sulfur, solid sulfur particles are produced in the solution. If molten sulfur is produced, the sulfur is removed prior to regeneration. If the contacting is carried out below the melting point of sulfur, at least a portion of the sulfur crystals may be removed after regenerating the reactant, or at least a portion of the sulfur crystals may be removed after regeneration.

The reduced reactant produced, i.e., Fe(II) lignosulfonate, is regenerated, preferably by contacting the mixture in a regeneration zone or zones with oxygen. The term "oxygen", as used herein, includes oxygen-containing gases, such as air or air-enriched with oxygen. The oxygen oxidizes the reduced metal ions of the chelate to the higher valence state, and the regenerated mixture is returned to the contact zone. It is not necessary that all the Fe(II) lignosulfonate be regenerated; the aqueous reaction solution may comprise Fe(II) lignosulfonate. Electrochemical regeneration may also be employed.

In another embodiment of the invention, a sour gaseous stream containing $H_2S$ and $CO_2$ is contacted under reaction conditions with a selective absorbent-aqueous reactant mixture, preferably, at a temperature below the melting point of sulfur, the aqueous reactant mixture and procedure being similar to that described, supra. Broadly, this is accomplished by the use of an absorbent mixture containing a selective absorbent for $CO_2$ (and preferably for $H_2S$, as well), and an effective amount of Fe(III) lignosulfonate. A purified or "sweet" gaseous stream will be produced. The $CO_2$ will be absorbed and the $H_2S$ is converted to sulfur by the iron(III) lignosulfonate. In the process, the iron(III) lignosulfonate is reduced, and the sulfur may be treated, as described, supra. As in the previous embodiment, the sulfur may be removed prior to or subsequent to regeneration of the admixture. Preferably, if the volume of $CO_2$ absorbed is large, the reactant-containing solution is treated, such as by heating or pressure reduction, to remove the bulk of the $CO_2$ before regeneration of the reactant. Regeneration may be accomplished either prior to or subsequent to sulfur removal. Alternately, or if small quantities of $CO_2$ are absorbed, the $CO_2$ may simply be stripped in the regeneration zone.

As indicated, supra, the invention also provides in this embodiment for the regeneration of the reactant and the absorbent. Preferably, the loaded absorbent mixture and the solution containing iron(II) lignosulfonate are regenerated by contacting the mixture in a regeneration zone or zones with an oxygen-containing gas. The oxygen-containing gas may be air, oxygen, or air-enriched with oxygen. The oxygen-containing gas accomplishes two functions, the stripping of the $CO_2$ from the loaded absorbent mixture, and the oxidation of the reduced reactant to a higher oxidation state. The oxygen (in whatever form supplied) is supplied in a stoichiometric equivalent or excess with respect to the amount of reduced reactant present in the mixture. Preferably, the oxygen-containing gas is supplied in an amount of from about 1.2 to 3 times excess. As will be recognized by those skilled in the art, the stream or portion to be regenerated will preferably still contain significant quantities of iron(III) lignosulfonate.

DETAILED DESCRIPTION OF THE INVENTION

The particular type of gaseous stream treated is not critical, as will be evident to those skilled in the art.

Streams particularly suited to removal of $H_2S$ and $CO_2$ by the practice of the invention are, as indicated, naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon streams", as employed herein, is intended to include streams containing significant quantities of hydrocarbon (both paraffinic and aromatic), it being recognized that such streams contain significant "impurities" not technically defined as hydrocarbon. Again, streams containing principally a single hydrocarbon e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, and may range from about 0.5 percent to over 99 percent by volume. Obviously, the amounts of $H_2S$ and $CO_2$ present are not generally a limiting factor in the practice of the invention.

The temperatures employed in the contacting or absorption-contact zone are not generally critical. Preferably, the reaction is carried out at a temperature below the melting point of sulfur, and, if an absorbent is used, temperatures must permit acceptable absorption of $CO_2$. In many commercial applications, such as the removal of $H_2S$ and $CO_2$ from natural gas to meet pipeline specifications, contacting at ambient temperatures is desired, since the cost of refrigeration would exceed the benefits obtained due to increased absorption at the lower temperature. In general, temperatures of from 20° C. to 80° C. are suitable, and temperatures from 40° C. to 60° C. are preferred. Contact times may range from about 1 second to about 270 seconds or longer, with contact times of 2 seconds to 120 seconds being preferred.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture is required before return of the absorbent mixture to the absorption zone. In general, temperatures of from about 20° C. to 80° C., preferably 40° C. to 60° C., may be employed.

Pressure conditions in the absorption zone may vary widely, depending on the pressure of the gas to be treated. For example, pressures in the absorption zone may vary from one atmosphere up to one hundred fifty or even two hundred atmospheres. Pressures of from one atmosphere to about one hundred atmospheres are preferred. In the regeneration or desorption zone or zones, pressures may be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, issued Dec. 11, 1962, and U.S. Pat. No. 4,009,251 to Meuly, issued Feb. 22, 1977, which disclosures are incorporated herein by reference. Preferably, pH in the process of the invention will range from about 5 to about 7.5. The process is preferably conducted continuously.

As indicated, the $H_2S$, when contacted, is quickly converted by a solution of Fe(III) lignosulfonate to elemental sulfur. Iron lignosulfonate is a complex chemical structure containing iron and lignosulfonate made by sulfonating lignin from wood cellulose. One commercial form, known as DFE 516, marketed by Milchem, Inc., contains about seven percent by weight iron. The proportion of iron(III) may vary from 1 to 8 percent by weight of the composition. The amount of iron(III) lignosulfonate compound supplied is an effective amount, i.e., an amount sufficient to convert all or substantially all of the $H_2S$ in the gas stream, and may range up to the solubility limit of the iron(III) lignosulfonate composition. Those skilled in the art will recognize that reduced, i.e., Fe(II), composition may be supplied in solution if the composition is oxidized or "regenerated" prior to contacting the $H_2S$. As indicated, the aqueous reaction solution may contain Fe(II) lignosulfonate. Generally, the Fe(III), supplied as the Fe(III) lignosulfonate, should be present in a molar ratio of at least 2 to 1, basis $H_2S$. Ratios of from about 2 mols to about 15 mols of iron(III) as the lignosulfonate per mol of $H_2S$ may be used, with ratios of from about 3 mols per mol to about 5 mols of iron(III) as the lignosulfonate per mol of $H_2S$ being preferred. The manner of preparing the admixture containing an absorbent is a matter of choice. For example, iron(III) lignosulfonate may be added to the absorbent, and, if necessary, then water added. The amount of water added will normally be just that amount necessary to achieve solution of the iron-(III) lignosfulfonate, and can be determined by routine experimentation. Since the iron(III) lignosulfonate has good solubility in the solvent, and since water is produced by the reaction of the $H_2S$ and the chelate, precise amounts of water to be added cannot be given. In the case of absorbents having a low solubility for the composition, approximately 5 percent to 10 percent of water by volume, based on the total volume of the absorbent mixture, will generally provide solvency. Preferably, however, the iron(III) lignosulfonate is added as an aqueous solution to the liquid absorbent. Where the reactant is supplied as an aqueous solution, the amount of solution supplied may be about 20 percent to about 80 percent by volume of the total absorbent admixture supplied to the absorption zone. The lignosulfonate solution will generally be supplied as an aqueous solution having a concentration of from about 0.1 molar to about 0.5 molar, and a concentration of about 0.4 molar is preferred.

The absorbents employed in this invention are those absorbents which have a high degree of selectivity in absorbing $CO_2$ (and preferably $H_2S$ as well) from the gaseous streams. Any of the known absorbents conventionally used which do not affect the activity of the reactant and which exhibit sufficient solubility for the reactant may be employed. As indicated, the absorbent preferably has good absorbency for $H_2S$ as well, in order to assist in the removal of any $H_2S$ present in the gaseous stream. The particular absorbent chosen is a matter of choice and depends on the solubility of the iron lignosulfonate, therein. Given these qualifications, selection can be made by routine experimentation. For example, diethylene glycol monoethyl ether, propylene carbonate, tetraethylene glycol-dimethyl ether, N- methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art. The manner of recovering the sulfur may be selected by those skilled in the art.

In order to further clarify the invention, the following illustration is given. The values given herein relating to temperatures, pressures, compositions, etc., are exemplary and should not be taken as delimiting the invention.

A gaseous stream comprising $H_2S/N_2$ and containing 2.1 percent by weight of $H_2S$ enters a contact vessel containing an aqueous mixture comprising 2.8 percent by weight Fe (based on the total weight of the mixture) as Fe(III) lignosulfonate. The Fe(III) composition is supplied in a 3/1 molar ratio basis the $H_2S$, and the pH of the system is 5.7. The pressure of the feed gas is about 1 atmosphere, and the temperature of the mixture is about 40° C. A contact time of about 2 seconds is employed. Good gas-liquid contact is achieved by stirring the mixture vigorously and some foaming occurs. In the mixture, the $H_2S$ is converted to elemental sulfur by the Fe(III) lignosulfonate, Fe(III) composition in the process being converted to Fe(II) lignosulfonate. Solid particulate sulfur is produced in the solution.

In another cyclic run, carried out in a batch reactor, sour gas, e.g., $H_2S$ in $N_2$, containing about 2.7 percent by volume $H_2S$, enters a reactor vessel which contains an aqueous admixture comprising an aqueous 0.5M solution of Fe(III) lignosulfonate having a pH ranging from 5–7, the Fe(III) composition being supplied in a 3/1 molar ratio, basis the $H_2S$. The pressure of the feed gas is about 1 atmosphere and the temperature of the aqueous admixture is about 40° C. A contact time of about 2 seconds is employed in order to react all the $H_2S$. Purified or "sweet" gas leaves the contactor. In the admixture, the $H_2S$ is converted to elemental sulfur by the Fe(III) lignosulfonate, Fe(III) lignosulfonate in the process being converted to the Fe(II) lignosulfonate. Sulfur is removed at the end of the run (about 40 cycles) by filtration. The spent solution is regenerated by passing excess air through the reactor after stopping the sour gas flow, thus converting the Fe(II) lignosulfonate in the admixture to the Fe(III) lignosulfonate. The temperature during regeneration is about 40° C., and pressure is about one atmosphere.

Those skilled in the art will recognize that in a continuous cyclic operation not all the Fe(III) composition is converted, and in fact, should not be. The "spent" solution thus contains both Fe(III) and Fe(II) species. In such a continuous operation, it is not necessary that all the sulfur be removed in the sulfur recovery step, and some sulfur retention may be beneficial. The type of unit chosen is thus flexible. Preferably, the amount of sulfur removed is simply balanced with the rate of sulfur intake in the reactor, which is, of course, dependent on the amount of $H_2S$ in the gas stream. Those skilled in the art may adjust the appropriate rates of withdrawal of the streams.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is, of course, well within the scope of the invention.

Again, as will be understood by those skilled in the art, the solutions or mixtures employed may contain other materials or additives for given purposes.

What is claimed is:

1. A process for the removal of $H_2S$ from a sour gaseous stream comprising contacting the sour gaseous stream, under conditions to convert $H_2S$, in a contacting zone with an aqueous reaction solution comprising an effective amount of iron(III) lignosulfonate, and producing a sweet gas stream and an aqueous solution containing sulfur and iron(II) lignosulfonate.

2. The process of claim 1 wherein the stream from which the $H_2S$ is removed is selected from naturally-occurring gases, synthesis gases, process gases, and fuel gases, the contacting is carried out below the melting point of sulfur, and solid sulfur is produced.

3. The process of claim 1 wherein the sour gaseous stream is selected from natural gas, a stream derived from the gasification of coal, or a hydrocarbon stream, the contacting is carried out below the melting point of sulfur, and solid sulfur is produced.

4. A process for the removal of $H_2S$ from a sour gaseous stream comprising
   (a) contacting the sour gaseous stream, under conditions to convert $H_2S$, in a contacting zone with an aqueous reaction solution comprising an effective amount of Fe(III) lignosulfonate, producing a sweet gas stream, and sulfur and Fe(II) lignosulfonate in an aqueous mixture;
   (b) removing sulfur from the aqueous mixture;
   (c) regenerating aqueous mixture from step (b) in a regenerating zone, producing Fe(III) lignosulfonate in a regenerated solution; and
   (d) returning regenerated solution from step (c) to the contacting zone for use as the aqueous reaction solution therein.

5. The process of claim 4 wherein the stream from which the $H_2S$ is removed is selected from naturally-occurring gases, synthesis gases, process gases, and fuel gases, the contacting is carried out below the melting point of sulfur, and solid sulfur is produced.

6. The process of claim 4 wherein the sour gaseous stream is selected from natural gas, a stream derived from the gasification of coal, or a hydrocarbon stream, the contacting is carried out below the melting point of sulfur, and solid sulfur is produced.

7. A process for the removal of $H_2S$ from a sour gaseous stream comprising
   (a) contacting the sour gaseous stream, under conditions to convert $H_2S$, in a contacting zone with an aqueous reaction solution comprising an effective amount of Fe(III) lignosulfonate, producing a sweet gas stream, and sulfur and Fe(II) lignosulfonate in an aqueous mixture;
   (b) regenerating aqueous mixture from step (a) in a regenerating zone, producing Fe(III) lignosulfonate in a regenerated solution;

(c) removing sulfur from the regenerated solution; and (d) returning regenerated solution from step (c) to the contacting zone for use as the aqueous reaction solution therein.

8. The process of claim 7 wherein the stream from which the H$_2$S is removed is selected from naturally-occurring gases, synthesis gases, process gases, and fuel gases, the contacting is carried out below the melting point of sulfur, and solid sulfur is produced.

9. The process of claim 7 wherein the sour gaseous stream is selected from natural gas, a stream derived from the gasification of coal, or a hydrocarbon stream, the contacting is carried out below the melting point of sulfur, and solid sulfur is produced.

10. A process for the removal of H$_2$S from a sour gaseous stream comprising (a) contacting the sour gaseous stream, under conditions to convert H$_2$S, in a contacting zone with an aqueous reaction solution at a temperature below the melting point of sulfur, the solution comprising an effective amount of Fe(III) lignosulfonate, producing a sweet gas stream, and solid sulfur and Fe(II) lignosulfonate in an aqueous mixture;

(b) removing solid sulfur from the aqueous mixture;

(c) regenerating aqueous mixture from step (b) in a regenerating zone, producing Fe(III) lignosulfonate in a regenerated solution; and (d) returning regenerated solution from step (c) to the contacting zone for use as the aqueous reaction solution therein.

11. A process for the removal of H$_2$S from a sour gaseous stream comprising (a) contacting the sour gaseous stream, under conditions to convert H$_2$S, in a contacting zone with an aqueous reaction solution at a temperature below the melting point of sulfur, the solution comprising an effective amount of Fe(III) lignosulfonate, producing a sweet gas stream, and solid sulfur and Fe(II) lignosulfonate in an aqueous mixture;

(b) regenerating aqueous mixture from step (a) in a regenerating zone, producing Fe(III) lignosulfonate in a regenerated solution;

(c) removing solid sulfur from the regenerated solution; and (d) returning regenerated solution from step (c) to the contacting zone for use as the aqueous reaction solution therein.

* * * * *